(12) United States Patent
Hong et al.

(10) Patent No.: US 11,205,791 B2
(45) Date of Patent: Dec. 21, 2021

(54) APPARATUS FOR INSPECTING STACK ASSEMBLY

(71) Applicants: Hyundai Motor Company, Seoul (KR); Kia Motors Corporation, Seoul (KR)

(72) Inventors: Hee Seung Hong, Seoul (KR); Sung Hoon Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 273 days.

(21) Appl. No.: 16/659,638

(22) Filed: Oct. 22, 2019

(65) Prior Publication Data
US 2020/0243883 A1 Jul. 30, 2020

(30) Foreign Application Priority Data
Jan. 28, 2019 (KR) .................. 10-2019-0010752

(51) Int. Cl.
*H01M 8/04664* (2016.01)
*H01M 8/04746* (2016.01)
*H01M 8/0438* (2016.01)
*H01M 8/0273* (2016.01)

(52) U.S. Cl.
CPC ..... *H01M 8/04679* (2013.01); *H01M 8/0273* (2013.01); *H01M 8/04417* (2013.01); *H01M 8/04768* (2013.01)

(58) Field of Classification Search
CPC ............. H01M 8/0273; H01M 8/0438; H01M 8/04417; H01M 8/04432; H01M 8/04679; H01M 8/04746; H01M 8/04768; H01M 8/04783; Y02E 60/50
See application file for complete search history.

(56) References Cited

U.S. PATENT DOCUMENTS

| | | | |
|---|---|---|---|
| 2007/0193340 A1* | 8/2007 | Yoshida | H01M 8/04231 73/46 |
| 2011/0262823 A1* | 10/2011 | Seitz | H01M 8/0441 429/443 |
| 2017/0110746 A1* | 4/2017 | Mack | H01M 8/04477 |

* cited by examiner

*Primary Examiner* — Brittany L Raymond
(74) *Attorney, Agent, or Firm* — Mintz Levin Cohn Ferris Glovsky and Popeo, P.C.; Peter F. Corless

(57) ABSTRACT

An apparatus for inspecting a stack assembly including a fluid channel through which fluid is supplied into fuel cell stacks includes a frame, a conveyor that is installed in the frame and that carries the stack assembly in a predetermined direction of movement to locate the stack assembly in a predetermined inspection position, a masking mechanism that is installed in the frame and that masks a fluid inlet and a fluid outlet of the stack assembly to seal the fluid channel of the stack assembly from outside the stack assembly, and a gas injection mechanism that is installed in the frame and that injects an inspection gas into the fluid channel of the stack assembly to inspect a sealing state of the fluid channel in the stack assembly, in a state in which the stack assembly is sealed by the masking mechanism.

17 Claims, 13 Drawing Sheets

APPARATUS FOR INSPECTING STACK ASSEMBLY

CROSS-REFERENCE TO RELATED APPLICATION

This application claims under 35 U.S.C. § 119(a) the benefit of Korean Patent Application No. 10-2019-0010752, filed in the Korean Intellectual Property Office on Jan. 28, 2019, the entire contents of which are incorporated herein by reference.

BACKGROUND

(a) Technical Field

The present disclosure relates to an apparatus for inspecting a stack assembly, more particularly, to a stack assembly inspection apparatus for inspecting a sealing state or an insulation state of the stack assembly.

(b) Description of the Related Art

A stack assembly, which is an assembly of fuel cell stacks, may be mounted in a fuel cell vehicle.

Each of the fuel cell stacks has a plurality of fuel cells stacked one above another. To operate the fuel cell stacks, hydrogen fuel and air, including oxygen that electrochemically reacts with the hydrogen to produce electricity, must be supplied into the fuel cell stacks.

To this end, the stack assembly includes an air flow channel and a hydrogen flow channel. Meanwhile, heat is generated together when the fuel cell stacks produce electricity, and power generation performance may be deteriorated if temperatures of the fuel cell stacks are excessively raised. Due to the negative consequences of elevated temperatures, a coolant flow channel through which coolant flows is included in the stack assembly to cool the fuel cell stacks.

As described above, the stack assembly includes the flow channels through which the different fluids flow. The flow channels have to be sealed from one another. If not, the flow channels may cause not only deterioration in the power generation performance of the fuel cell stacks but also damage to the fuel cell stacks.

In the related art, a worker manually inspects the sealing state of a completed stack assembly by identifying a pressure drop of an inspection gas (e.g., helium) using a pressure gauge while injecting the inspection gas into fluid channels of the stack assembly. In this case, the inspection result may not be accurate, and work efficiency may be deteriorated.

Meanwhile, a plurality of fuel cell stacks are operated in a stack assembly to generate high voltage, and a positive electrode terminal and a negative electrode terminal are provided to supply the voltage generated in the stack assembly to the outside. The casing of the stack assembly, in addition to the positive electrode terminal and the negative electrode terminal, has to be insulated to prevent electric current from flowing through the casing. If the casing is not insulated, electric current may flow through a member, for example, a frame of a vehicle brought into contact with the stack assembly to cause accidents.

In the related art, to inspect the insulation state of a completed stack assembly, a worker manually measures insulation resistance between a positive electrode terminal, a negative electrode terminal, and a casing of the stack assembly by using an insulation resistance measuring instrument. However, by relying on manual measurements, the inspection result may not be accurate, and work efficiency may be deteriorated.

SUMMARY

An aspect of the present disclosure provides a stack assembly inspection apparatus for inspecting a sealing state of a completed stack assembly.

Another aspect of the present disclosure provides a stack assembly inspection apparatus for inspecting an insulation state of a completed stack assembly.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a stack assembly inspection apparatus inspects a stack assembly that includes a plurality of fuel cell stacks and a fluid channel through which fluid is supplied into the plurality of fuel cell stacks. The stack assembly inspection apparatus includes a frame, a conveyor that is installed in the frame and that carries the stack assembly in a predetermined direction of movement to locate the stack assembly in a predetermined inspection position, a masking mechanism that is installed in the frame and that masks a fluid inlet and a fluid outlet of the stack assembly to seal the fluid channel of the stack assembly from outside the stack assembly, and a gas injection mechanism that is installed in the frame and that injects an inspection gas into the fluid channel of the stack assembly to inspect a sealing state of the fluid channel in the stack assembly, in a state in which the stack assembly is sealed by the masking mechanism.

According to an embodiment, the stack assembly inspection apparatus may further include an insulation inspection probe and an insulation resistance measuring device electrically connected with the insulation inspection probe, to inspect an insulation state of the stack assembly.

The insulation inspection probe may include a plurality of contact terminals that make contact with a plurality of points on the stack assembly when the stack assembly is located in the predetermined inspection position.

According to another aspect of the present disclosure, a stack assembly inspection apparatus inspects a stack assembly that includes a plurality of fuel cell stacks and a fluid channel through which fluid is supplied into the plurality of fuel cell stacks. The stack assembly inspection apparatus includes a frame, a conveyor that is installed in the frame and that carries the stack assembly, a masking mechanism that is installed in the frame and that seals the fluid channel of the stack assembly from outside the stack assembly, a gas injection mechanism that is installed in the frame and that inspects a sealing state of the fluid channel by using an inspection gas, and a controller including at least one processor and a memory that is connected to the at least one processor and that stores a plurality of instructions.

The instructions, when executed, cause the processor to control the conveyor to locate the stack assembly in a predetermined inspection position, control the masking mechanism to mask a fluid inlet and a fluid outlet of the stack assembly, in a state in which the stack assembly is located in the predetermined inspection position, and control the gas injection mechanism to inspect a sealing state of the stack assembly while injecting the inspection gas into the fluid channel of the stack assembly, in a state in which the stack assembly is sealed by the making mechanism.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
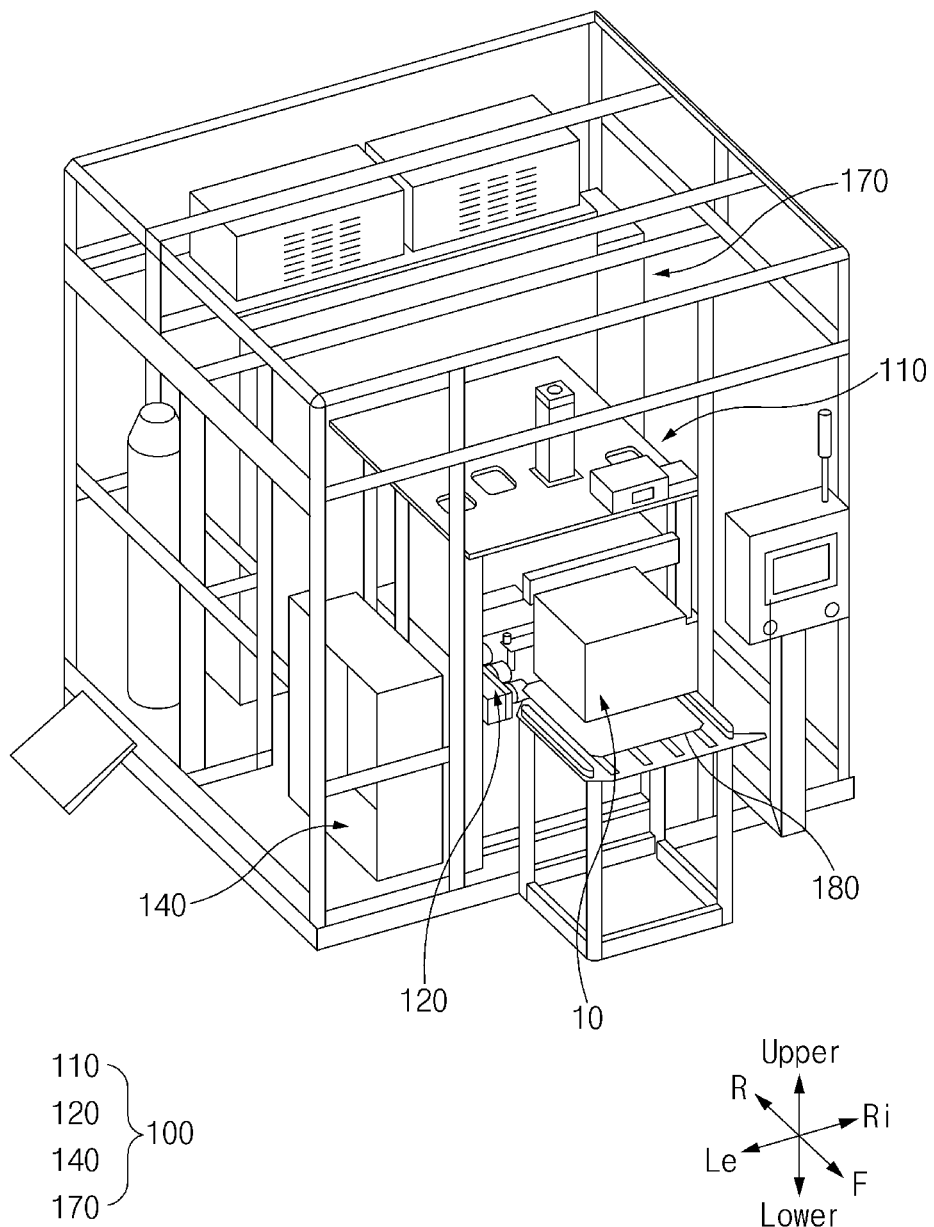
FIG. 1 is a perspective view illustrating a stack assembly inspection apparatus according to an embodiment of the present disclosure and a stack assembly.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, they may mean the components are not only directly "connected", "coupled", or "linked" but also are indirectly "connected", "coupled", or "linked" via a third component.

Figure 2:
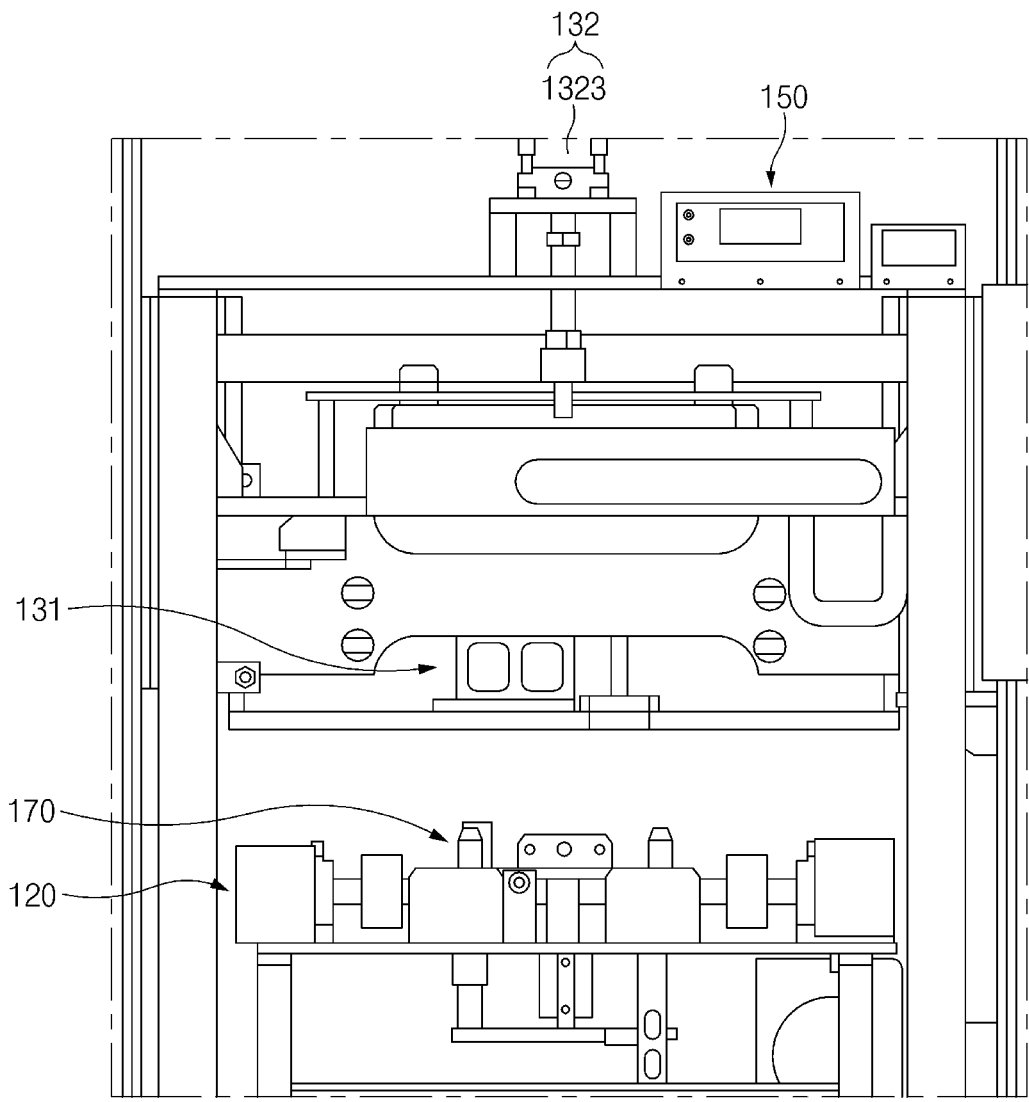
FIG. 2 is a front view illustrating the stack assembly inspection apparatus of FIG. 1.
Figure 3:
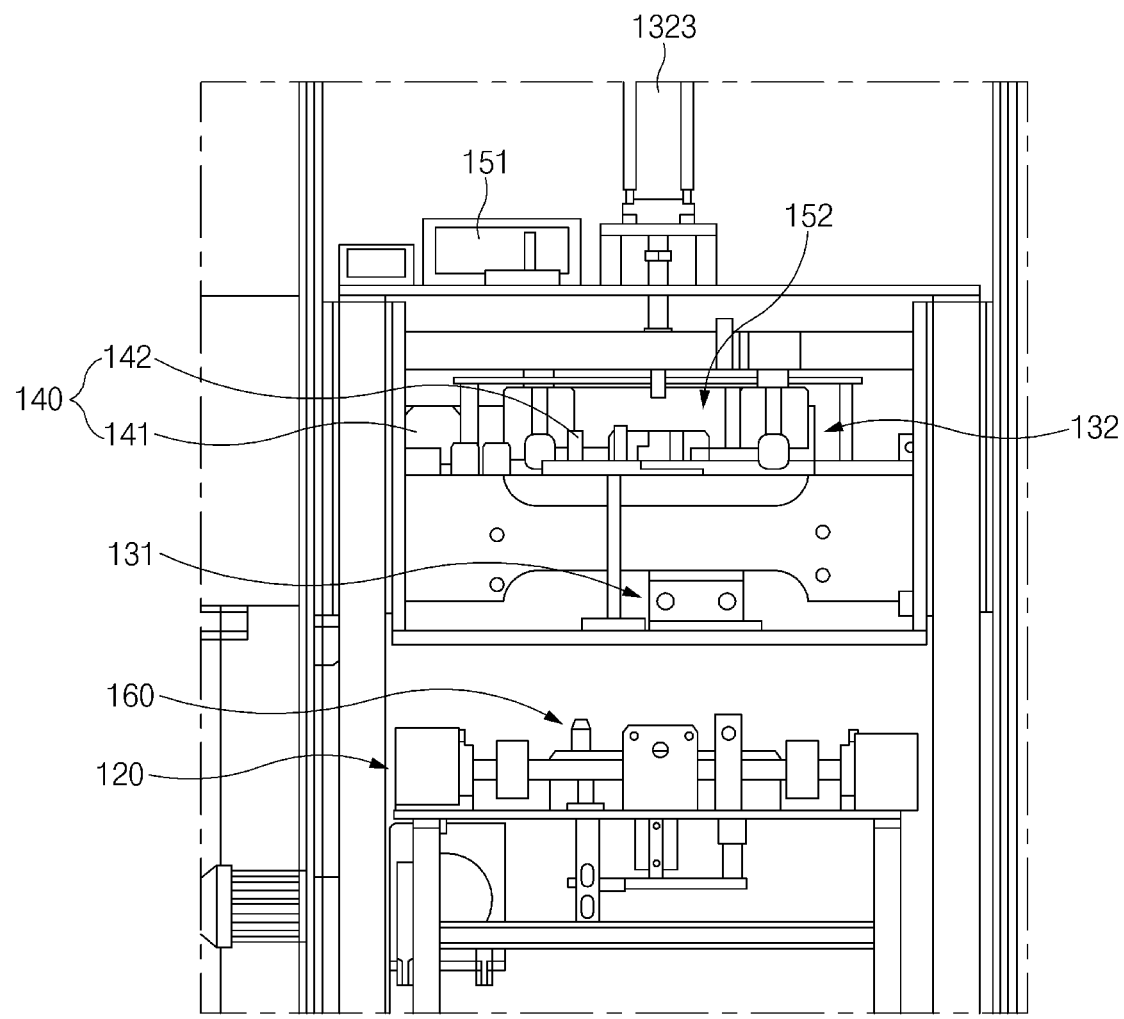
FIG. 3 is a rear view illustrating the stack assembly inspection apparatus of FIG. 1.

FIG. 1 is a perspective view illustrating a stack assembly inspection apparatus according to an embodiment of the present disclosure and a stack assembly. FIG. 2 is a front view illustrating the stack assembly inspection apparatus of FIG. 1. FIG. 3 is a rear view illustrating the stack assembly inspection apparatus of FIG. 1.

The stack assembly inspection apparatus 100 according to this embodiment is configured to inspect the stack assembly 10 that includes a plurality of fuel cell stacks and fluid channels for supplying fluids into the fuel cell stacks. The stack assembly inspection apparatus 100 includes a frame 110, a conveyor 120, a masking mechanism 130, and a gas injection mechanism 140.

Components of the stack assembly inspection apparatus 100 may be installed in the frame 110. The frame 110 may provide predetermined positions for stably fixing the components of the stack assembly inspection apparatus 100.

Conveyor 120, Fixing Mechanism 160, and Mounting Jig 180

Figure 4:
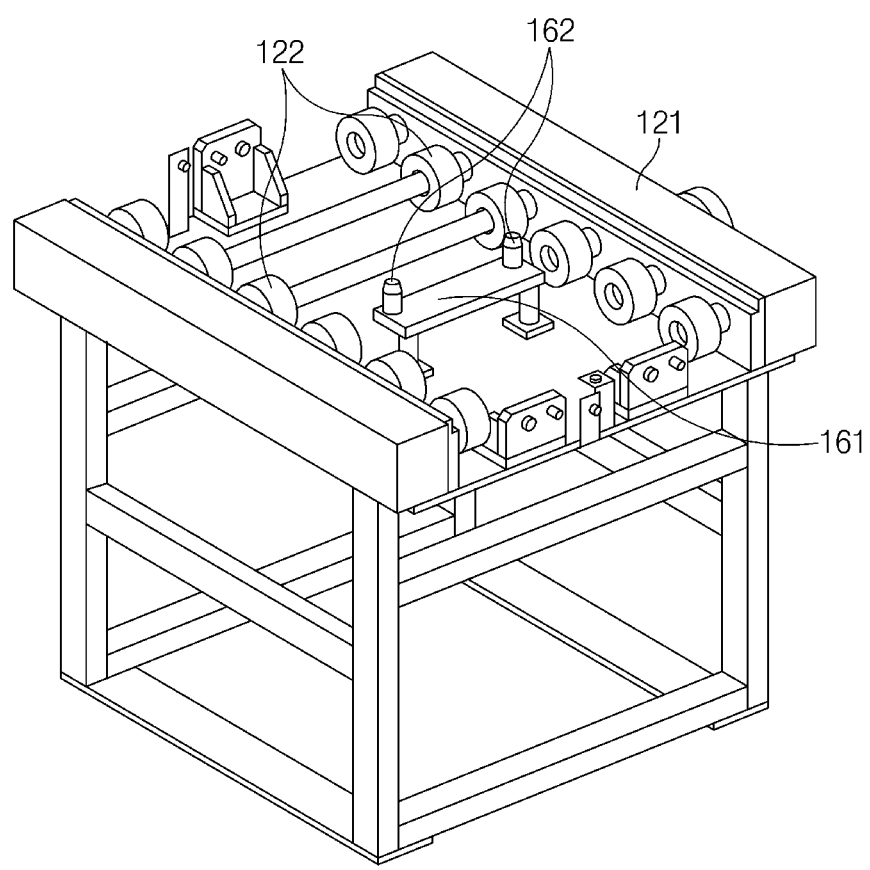
FIG. 4 is a perspective view illustrating a conveyor of the stack assembly inspection apparatus according to an embodiment of the present disclosure.

FIG. 4 is a perspective view illustrating the conveyor of the stack assembly inspection apparatus according to an embodiment of the present disclosure.

The conveyor 120 may be installed in the frame 110. The conveyor 120 may carry the stack assembly 10 in a predetermined direction of movement (in the rear direction in this embodiment, referring to FIG. 1) to locate the stack assembly 10 in a predetermined inspection position.

Referring to FIG. 4, the conveyor 120 may include a conveyor frame 121 and a roller 122.

The conveyor frame 121 may provide a space in which the roller 122 is installed. The conveyor frame 121 may support the roller 122.

A plurality of rollers 122 may be installed in the conveyor frame 121. The plurality of rollers 122 may be arranged in parallel on opposite sides of the conveyor frame 121 to carry the stack assembly 10 in predetermined directions of movement, that is, in the front and rear directions (referring to FIG. 1).

The stack assembly inspection apparatus 100 according to this embodiment may further include the fixing mechanism 160. The fixing mechanism 160 may fix the stack assembly 10 in the predetermined inspection position during inspection of the stack assembly 10.

The fixing mechanism 160 may be installed in the conveyor frame 110. The fixing mechanism 160 may include a fixing mechanism body 161 and fixing pins 162 installed on the fixing mechanism body 161.

The fixing mechanism body 161 may be vertically driven by a separate actuator (not illustrated). When the fixing mechanism body 161 is vertically driven by the actuator, the fixing pins 162 installed on the fixing mechanism body 161 may fix the stack assembly 10 in the predetermined inspection position while being vertically moved together with the fixing mechanism body 161.

The stack assembly inspection apparatus 100 according to this embodiment may further include the mounting jig 180 on which the stack assembly 10 is mounted. The mounting jig 180 having the stack assembly 10 mounted thereon may be carried in the front and rear directions by the conveyor 120.

When the mounting jig 180 having the stack assembly 10 mounted thereon is carried to a position where the stack assembly 10 is located in the predetermined inspection position, the fixing mechanism 160 may be moved toward the mounting jig 180 and combined with the mounting jig 180.

Accordingly, damage to the stack assembly 10 may be prevented in the process of carrying or fixing the stack assembly 10 in order to inspect the stack assembly 10, and inspection of the stack assembly 10 that will be described below may be stably conducted.

First Masking Mechanism 131

Figure 5:
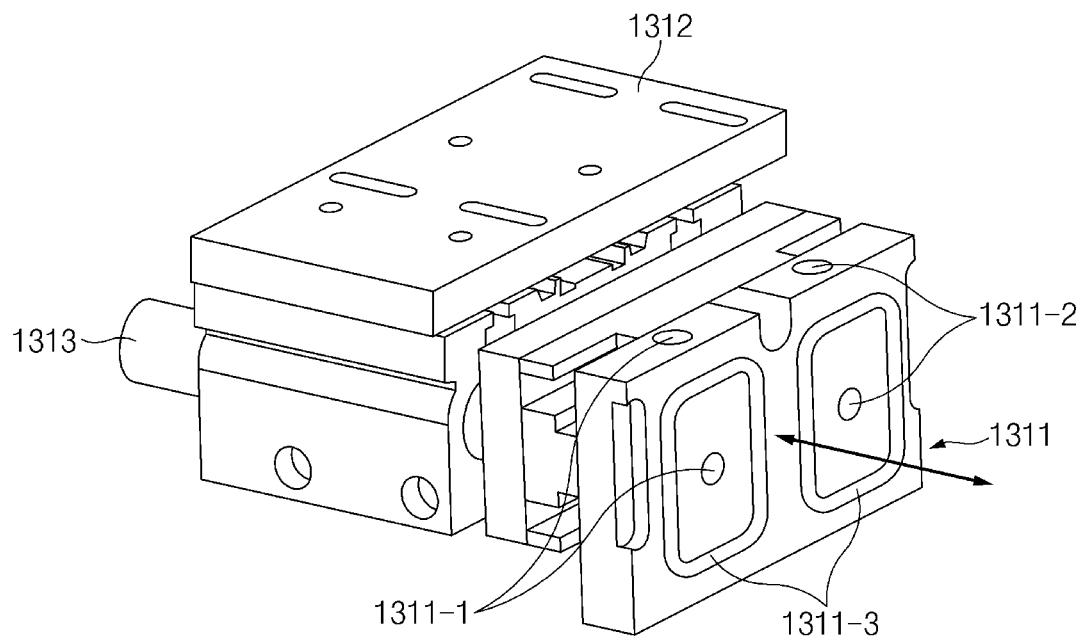
FIG. 5 is a perspective view illustrating a first masking mechanism of the stack assembly inspection apparatus according to an embodiment of the present disclosure.
Figure 5:
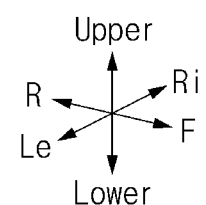

FIG. 5 is a perspective view illustrating the first masking mechanism of the stack assembly inspection apparatus according to an embodiment of the present disclosure.

The stack assembly 10 may include a hydrogen flow channel through which hydrogen is supplied into the fuel cell stacks, an air flow channel through which air is supplied into the fuel cell stacks, and a coolant flow channel through which coolant flows to cool the fuel cell stacks.

The stack assembly 10 may include a first inlet and a first outlet that are formed in the surface (that is, the front side surface) of the stack assembly 10 that faces the predetermined direction of movement. The first inlet and the first outlet may connect to any one of the hydrogen flow channel, the air flow channel, and the coolant flow channel.

In this embodiment, it will be exemplified that the first inlet and the first outlet are an air inlet and an air outlet that connect to the air flow channel of the stack assembly 10.

The masking mechanism 130 may include the first masking mechanism 131 for sealing the first inlet and the first outlet. That is, the first masking mechanism 131 may seal the air inlet and the air outlet of the stack assembly 10.

To this end, the first masking mechanism 131 may include a first masking pad 1311 that masks the first inlet and the first outlet.

The first masking pad 1311 may be moved forward and brought into close contact with the first inlet and the first outlet when the stack assembly 10 is located in the predetermined inspection position.

The first masking pad 1311 may have first masking pad recesses 1311-3 formed in shapes corresponding to the shapes of the first inlet and the first outlet to effectively seal the first inlet and the first outlet.

The first masking pad 1311 may have first masking pad inlets 1311-1 and first masking pad outlets 1311-2 formed therein, and the gas injection mechanism 140, which will be described below, may inject an inspection gas into the air flow channel of the stack assembly 10 through the first masking pad inlets 1311-1 and the first masking pad outlets 1311-2.

The first masking mechanism 131 may include a first masking mechanism body 1312 installed in the frame 110 and a first masking pad actuator 1313 that is installed on the first masking mechanism body 1312 and that actuates the first masking pad 1311.

Any actuator capable of linearly moving the first masking pad 1311 in the front and rear directions may be used as the first masking pad actuator 1313. For example, the first masking pad actuator 1313 may be a drive cylinder.

Second Masking Mechanism 132

Figure 6:
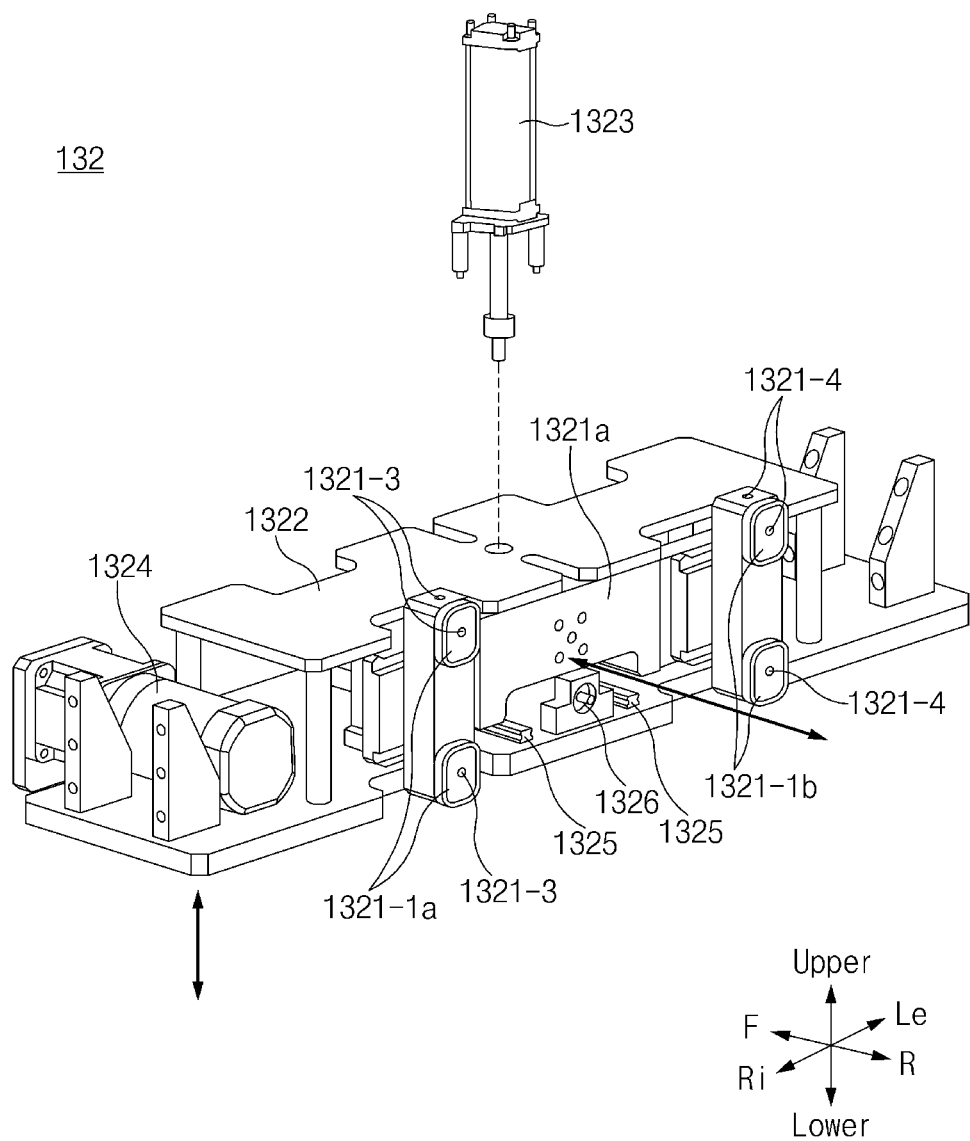
FIG. 6 is a perspective view illustrating a second masking mechanism of the stack assembly inspection apparatus according to an embodiment of the present disclosure.

FIG. 6 is a perspective view illustrating the second masking mechanism of the stack assembly inspection apparatus according to an embodiment of the present disclosure.

The stack assembly 10 may include a second inlet and a second outlet that are formed in the surface (that is, the rear side surface) of the stack assembly 10 that is opposite to the surface facing the predetermined direction of movement. The second inlet and the second outlet may connect to any one of the hydrogen flow channel, the air flow channel, and the coolant flow channel.

In this embodiment, it will be exemplified that the second inlet and the second outlet are a coolant inlet and a coolant outlet for an inflow/outflow of coolant.

The masking mechanism 130 may include the second masking mechanism 132 for sealing the second inlet and the second outlet. That is, the second masking mechanism 132 may seal the coolant inlet and the coolant outlet.

To this end, the second masking mechanism 132 may include a second masking pad 1321 that masks the second inlet and the second outlet. When the stack assembly 10 is located in the predetermined inspection position, the second masking pad 1321 may be moved downward and then forward and brought into close contact with the second inlet and the second outlet.

The second masking pad 1321 may include a plurality of second masking pad contact parts 1321-1a and 1321-1b that are brought into contact with the second inlet and the second outlet of the stack assembly 10 to seal the second inlet and the second outlet.

The plurality of second masking pad contact parts 1321-1a and 1321-1b may be installed on a second masking pad body 1321-2.

The second masking pad 1321 may have second masking pad inlets 1321-3 and second masking pad outlets 1321-4 formed therein, and the gas injection mechanism 140, which will be described below, may allow the inspection gas to flow into the coolant flow channel of the stack assembly 10 through the second masking pad inlets 1321-3 and the second masking pad outlets 1321-4.

The second masking pad body 1321-2 may be installed on a second masking mechanism body 1322 so as to be movable. The second masking pad body 1321-2 may be driven in the front and rear directions by a second masking pad actuator 1324.

The second masking pad actuator 1324 may be connected with the second masking pad body 1321-2 by one or more driving force transmission members. Although not illustrated in detail in FIG. 6, the second masking pad actuator 1324 may transmit a driving force generated by the second masking pad actuator 1324 to the second masking pad body 1321-2 through the driving force transmission members, such as a gear, a belt, or the like, between the second masking pad actuator 1324 and the second masking pad body 1321-2.

The second masking mechanism 132 may include a first linear guide 1325 to guide the linear motion of the second masking pad body 1321-2. The first linear guide 1325 may include a guide rail, and the second masking pad body 1321-2 may be mounted on the guide rail.

The second masking mechanism 132 may include a second linear guide 1326 to guide the linear motion of the second masking pad body 1321-2. The second linear guide 1326 may include a guiding member and a guiding shaft. The guiding member may be fixed to the second masking mechanism body 1322 and may include a guide hole. The guiding shaft may pass through the guide hole formed in the guiding member and may be combined with the second masking pad body 1321-2 to move together.

The second masking mechanism body 1322 may be vertically moved by a second masking body actuator 1323. The second masking body actuator 1323 may be installed in the frame 110, and the second masking mechanism body 1322 may be installed in the frame 110 so as to be moved by the second masking body actuator 1312.

Gas Injection Mechanism 140

Figure 7:
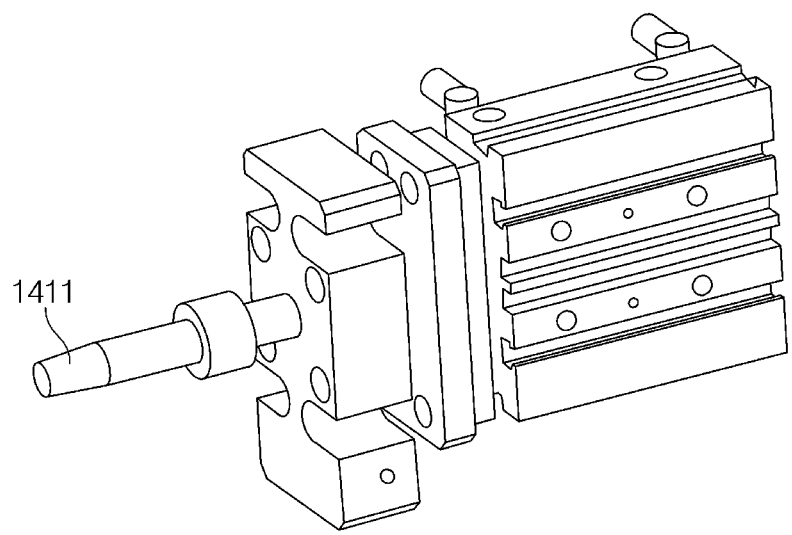
FIGS. 7 and 8 are views illustrating a gas injection mechanism of the stack assembly inspection apparatus according to an embodiment of the present disclosure.
Figure 8:
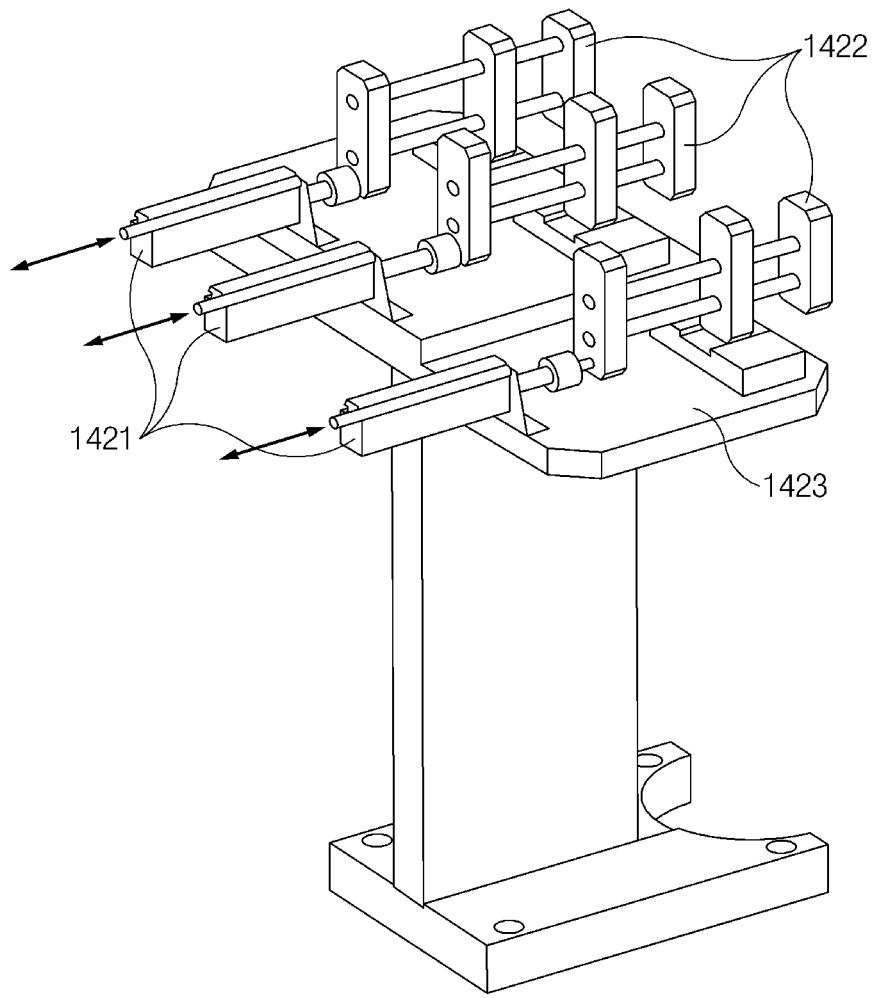

FIGS. 7 and 8 are views illustrating the gas injection mechanism of the stack assembly inspection apparatus according to an embodiment of the present disclosure.

To inspect sealing states of the fluid channels in the stack assembly 10, the gas injection mechanism 140 may inject the inspection gas into the fluid channels of the stack assembly 10, in the state in which the stack assembly 10 is sealed by the masking mechanism 130. The gas injection mechanism 140 may be installed in the frame 110.

As described above, the stack assembly 10 may include the hydrogen flow channel for supplying hydrogen into the fuel cell stacks, the air flow channel for supplying air into the fuel cell stacks, and the coolant flow channel through which coolant flows to cool the fuel cell stacks.

To inspect sealing states between the hydrogen flow channel, the air flow channel, and the coolant flow channel, the gas injection mechanism 140 may selectively inject the inspection gas into any one of the hydrogen flow channel, the air flow channel, and the coolant flow channel.

The inspection gas may be an inert gas. For example, the inspection gas may be helium (He).

The gas injection mechanism 140 may inject the inspection gas into a first flow channel (the air flow channel in this embodiment) of the stack assembly 10 through the first masking pad inlets 1311-1 and may inspect the sealing state of the first flow channel while suctioning the inspection gas from the first flow channel through the first masking pad outlets 1311-2.

The gas injection mechanism 140 may inject the inspection gas into a second flow channel (the coolant flow channel in this embodiment) of the stack assembly 10 through the second masking pad inlets 1321-3 and may inspect the sealing state of the second flow channel while suctioning the inspection gas from the second flow channel through the second masking pad outlets 1321-4.

The gas injection mechanism 140 may inspect the sealing state of a third flow channel (the hydrogen flow channel in this embodiment) in the stack assembly 10 by supplying the inspection gas into the third flow channel.

To this end, the gas injection mechanism 140 may include a gas injection device 141 that is selectively connected with the first flow channel, the second flow channel, and the third flow channel to supply the inspection gas.

Referring to FIG. 7, the gas injection device 141 may include a gas injection nozzle 1411. The gas injection nozzle 1411 may be directly connected with the first inlet (that is, the air inlet), the second inlet (that is, the coolant inlet), or the third inlet (that is, the hydrogen inlet) of the stack assembly 10, or may be indirectly connected with the first inlet, the second inlet, or the third inlet of the stack assembly 10 by a connecting member such as a hose, a pipe, or the like. The gas injection nozzle 1411 may selectively supply the inspection gas, which is delivered by a pump (not illustrated) of the gas injection mechanism 140, into the first inlet (that is, the air inlet), the second inlet (that is, the coolant inlet), or the third inlet (that is, the hydrogen inlet).

The stack assembly 10 may include a valve for adjusting the supply of fluid into at least one of the first flow channel, the second channel, and the third channel. The stack assembly 10 may include a connector for electrical connection with an external device.

The stack assembly 10 may include a valve for adjusting the supply of air, a valve for adjusting the supply of hydrogen, or a valve for adjusting the supply of coolant. The valves may be controlled by a controller (an external controller rather than a controller 170 in this embodiment) that controls the stack assembly 10. For example, when the stack assembly 10 is installed in a vehicle, a controller in the vehicle may control the valves of the stack assembly 10.

To supply the inspection gas into the fluid channels of the stack assembly 10, the valves have to be controlled to open the corresponding fluid channels.

To this end, the gas injection mechanism 140 may include a valve opening/closing probe 142.

Referring to FIG. 8, when the stack assembly 10 is located in the inspection position, the valve opening/closing probe 142 may be moved toward the connector and connected with the connector.

The valve opening/closing probe 142 may include contact terminals 1421 that are brought into contact with terminals of the connector to supply electrical signals to the terminals of the connector. The contact terminals 1421 may be brought into contact with the terminals of the connector that are electrically connected with the valves (e.g., an air valve, a hydrogen valve, and a coolant valve) of the stack assembly 10.

The valve opening/closing probe 142 may include actuating parts 1422 for moving the plurality of contact terminals 1421. Further, the valve opening/closing probe 142 may include a fixed part 1423 that is fixed to the frame 110 and on which the actuating parts 1422 are installed.

For example, the valve opening/closing probe 142 according to this embodiment may be connected with the connector to control the valve related to the supply of hydrogen.

Although not illustrated, the gas injection mechanism 140 may include a gas information acquisition device (not illustrated) that obtains the flow rates or pressures of the inspection gas before the introduction of the inspection gas into the fluid channels (i.e., "first" flow rates or pressures) and the flow rates or pressures of the inspection gas after the passage of the inspection gas through the fluid channels (i.e., "second" flow rates or pressures). The gas information acquisition device may provide the obtained information to the controller 170.

Insulation Resistance Measuring Mechanism 150

Figure 9:
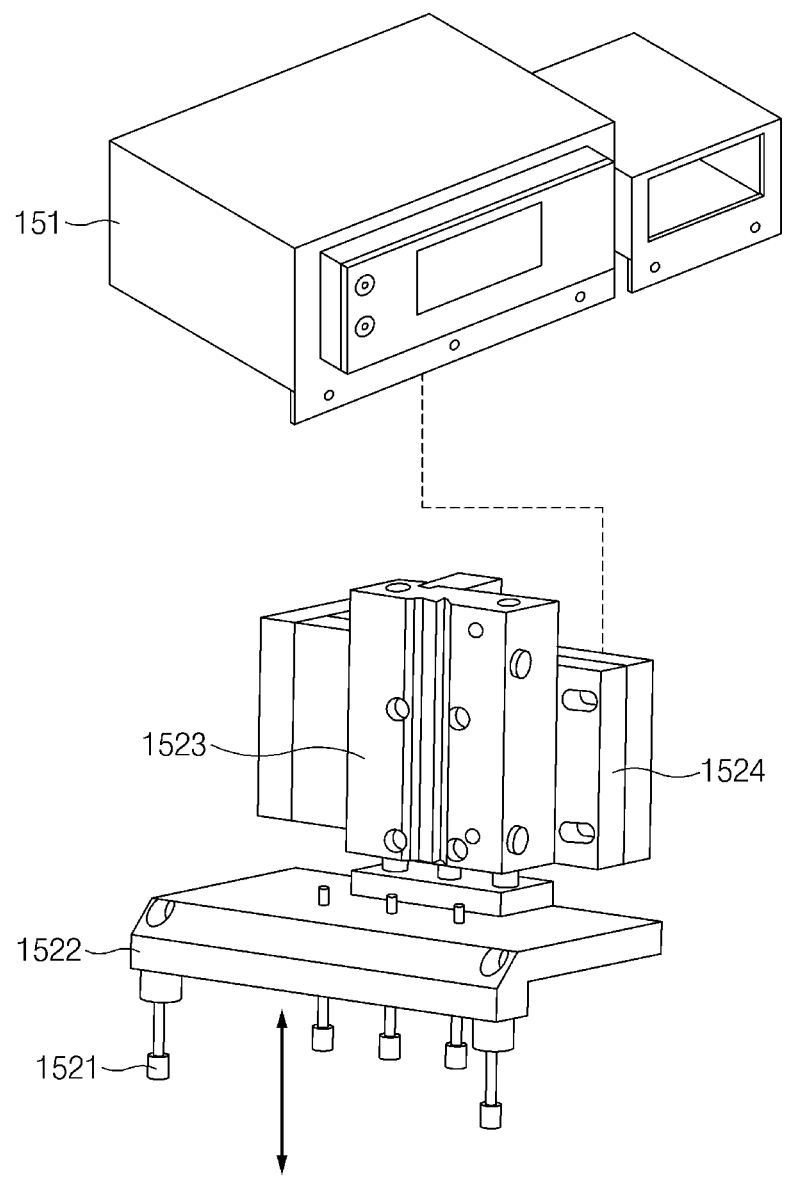
FIG. 9 is a view illustrating an insulation resistance measuring mechanism of the stack assembly inspection apparatus according to an embodiment of the present disclosure.
Figure 10:
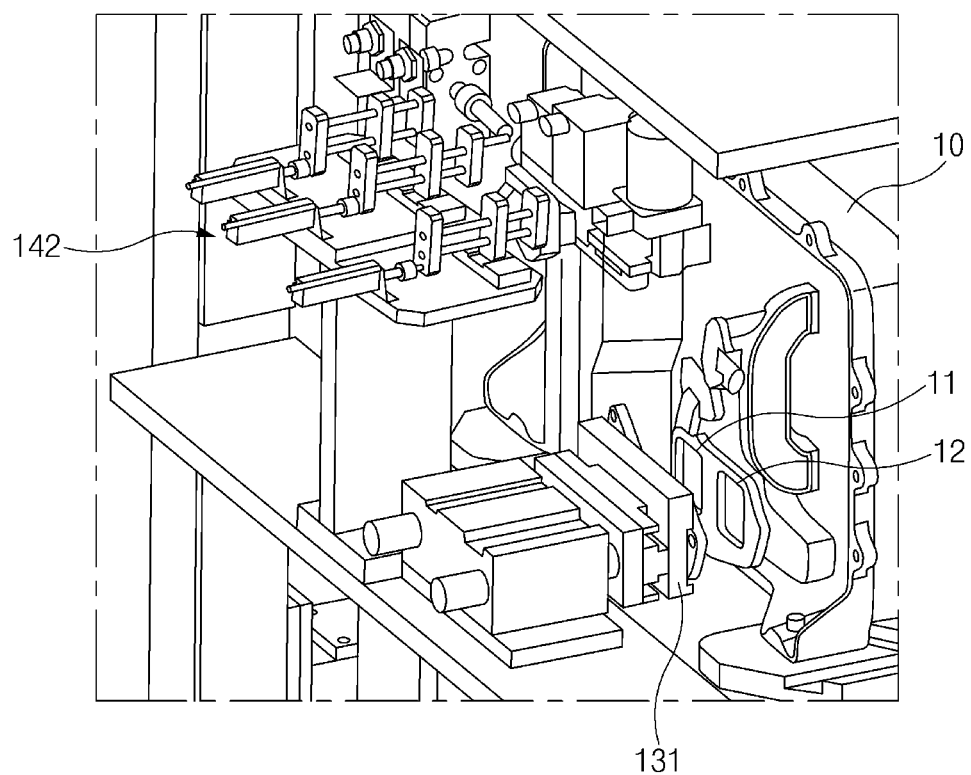
FIGS. 10 to 13 are views illustrating a process of performing inspection using the stack assembly inspection apparatus according to an embodiment of the present disclosure.
Figure 11:
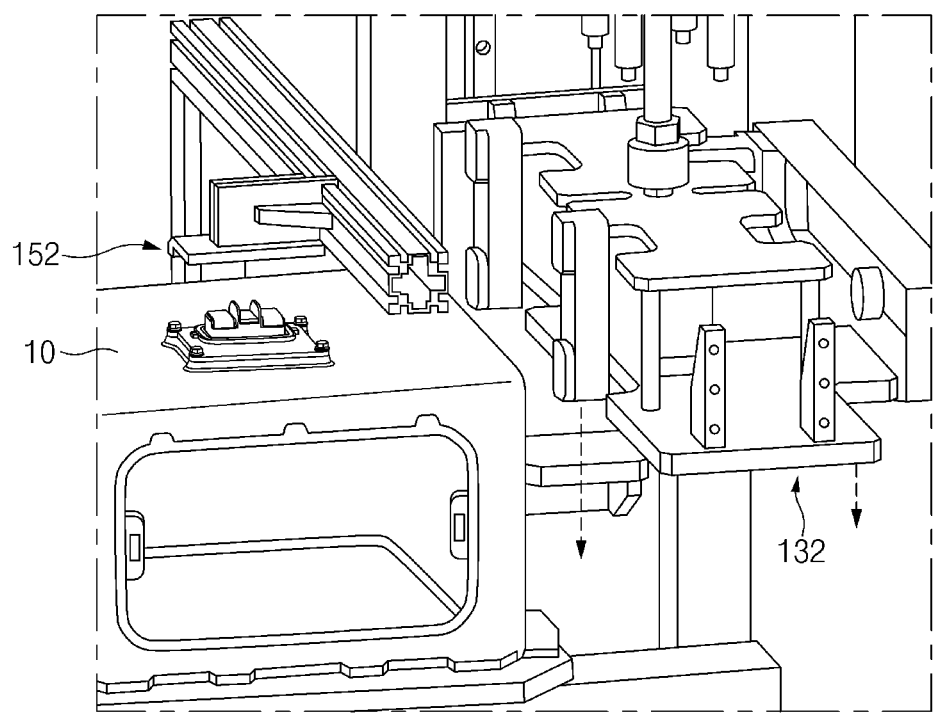
Figure 12:
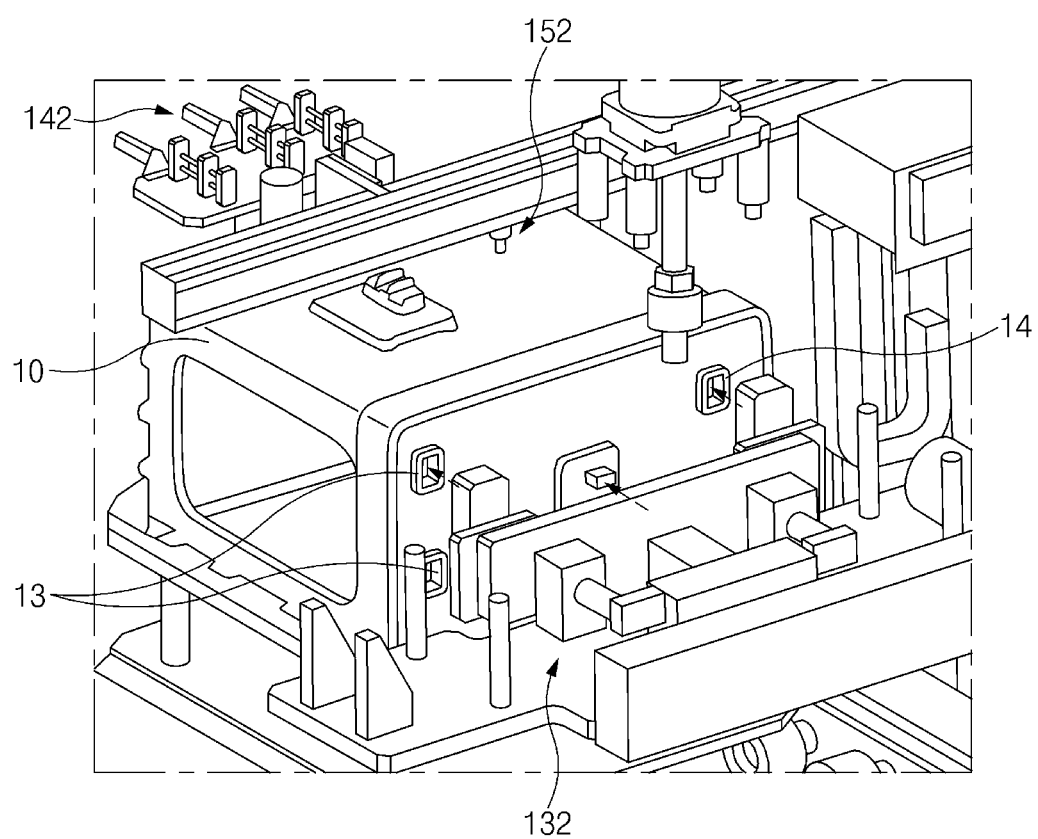
Figure 13:
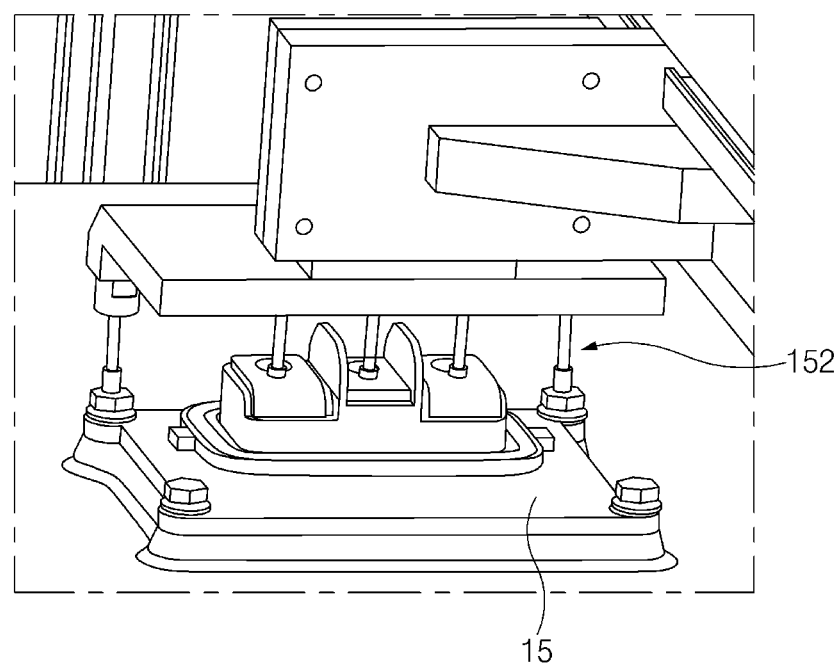

FIG. 9 is a view illustrating the insulation resistance measuring mechanism of the stack assembly inspection apparatus according to an embodiment of the present disclosure.

The stack assembly inspection apparatus 100 may further include the insulation resistance measuring mechanism 150 to inspect an insulation state of the stack assembly 10.

The insulation resistance measuring mechanism 150 may include an insulation inspection probe 152 and an insulation resistance measuring device 151 electrically connected with the insulation inspection probe 152.

The insulation inspection probe 152 may include a plurality of contact terminals 1521 that are brought into contact with a plurality of points on the stack assembly 10 when the stack assembly 10 is located in the inspection position.

The plurality of contact terminals 1521 may be installed on a movable part 1522. The plurality of contact terminals 1521 of the insulation inspection probe 152 may be brought into contact with a positive electrode terminal, a negative electrode terminal, and a case of the stack assembly 10 to inspect the insulation resistance between the positive electrode terminal of the stack assembly 10 and the case thereof and the insulation resistance between the negative electrode terminal of the stack assembly 10 and the case thereof.

The movable part 1522 may be vertically moved by an actuating part 1523. The movable part 1523 may be installed on a fixed part 1524, and the fixed part 1524 may be installed in the frame 110.

The stack assembly inspection apparatus 100 may include the controller 170 for controlling the overall configuration of the stack assembly inspection apparatus 100. The controller 170 may include at least one processor and a memory that is connected to the at least one processor and that stores a plurality of instructions.

Process of Performing Inspection

FIGS. 10 to 13 are views illustrating a process of performing inspection using the stack assembly inspection apparatus according to an embodiment of the present disclosure.

Hereinafter, the process of performing inspection using the stack assembly inspection apparatus 100 according to the embodiment of the present disclosure will be described.

First, the controller 170 controls the conveyor 120 to locate the stack assembly 10 in the predetermined inspection position.

When the stack assembly 10 mounted on the mounting jig 180 is located at the entrance of the conveyor 120, the conveyor 120 carries the stack assembly 10 to the inspection position under the control of the controller 170.

When the stack assembly 10 is carried to the inspection position, the controller 170 controls the fixing mechanism 160 to fix the stack assembly 10. The fixing mechanism 160 may be combined with the mounting jig 180 to fix the stack assembly 10 during inspection under the control of the controller 170.

The controller 170 may control the masking mechanism 130 to mask a fluid inlet and a fluid outlet of the stack assembly 10, with the stack assembly 10 located in the inspection position.

In particular, the controller 170 may control the first masking mechanism 131 to mask an air inlet 11 and an air outlet 12 of the stack assembly 10. The controller 170 may control the second masking mechanism 132 to mask a coolant inlet 13 and a coolant outlet 14 of the stack assembly 10.

The controller 170 may control the gas injection mechanism 140 to inspect the sealing state of the stack assembly 10 while injecting the inspection gas into the fluid channel (the air flow channel, the hydrogen flow channel, or the coolant flow channel) of the stack assembly 10, in the state in which the stack assembly 10 is sealed by the masking mechanism 130.

In particular, the controller 170 may control the valve opening/closing probe 142 to make contact with the connector terminal of the stack assembly 10 to open/close the valve related to the supply of hydrogen. The controller 170 may control the valve opening/closing probe 142 to open and close the valve (e.g., a hydrogen cut-off valve) of the stack assembly 10 that is related to the supply of hydrogen. The controller 170 may control the gas injection mechanism 140 to inject the inert gas (or the inspection gas), for example, helium into the stack assembly 10 through the gas injection device 141.

Accordingly, the controller 170 may inspect the sealing states of the fluid channels (the hydrogen flow channel, the air flow channel, and the coolant flow channel) in the stack assembly 10.

The controller 170 may inspect the quality of being airtight, based on information received from the gas information acquisition device. That is, the controller 170 may diagnose the sealing state of the stack assembly 10, based on the information received from the gas information acquisition device.

The controller 170 may close the remaining fluid channel other than two fluid channels to be inspected. In this state, the controller 170 may inspect the quality of being airtight by opening one of the two fluid channels and supplying the inspection gas into the other.

The controller 170 may inspect the quality of being airtight between the air flow channel and the hydrogen flow channel. For example, the controller 170 may control the gas injection mechanism 140 to allow the inspection gas to flow through the air flow channel and may control the masking mechanism 130 to close the coolant flow channel and open the hydrogen flow channel. In this state, the controller 170 may diagnose the sealing state between the air flow channel and the hydrogen flow channel, based on information regarding the first/second flow rates or pressures of the inspection gas before and after the introduction of the inspection gas into the air flow channel.

In this way, the controller 170 may inspect the quality of being airtight between the air flow channel and the coolant flow channel. Further, the controller 170 may inspect the quality of being airtight between the hydrogen flow channel and the coolant flow channel.

The controller 170 may control the plurality of contact terminals 1521 of the insulation inspection probe 152 to be brought into contact with the positive electrode terminal, the negative electrode terminal, and the case of the stack assembly 10 and may inspect the insulation state of the stack assembly 10, in the state in which the stack assembly 10 is located in the inspection position. The positive electrode terminal and the negative electrode terminal may be included in a terminal part 15 of the stack assembly 10.

The controller 170 may diagnose the insulation state of the stack assembly 10, based on information obtained from the insulation resistance measuring device 151. The controller 170 may determine the insulation state of the stack assembly 10, based on the insulation resistance between the positive electrode terminal of the stack assembly 10 and the case thereof and the insulation resistance between the negative electrode terminal of the stack assembly 10 and the case thereof.

The present disclosure described above may be implemented as computer readable code stored in a computer readable recording medium. The computer readable recording medium may include all types of storage devices for storing data that can be read by a computer system. Examples of the computer readable recording medium may include a hard disk drive (HDD), a solid state disk (SSD), a silicon disk drive (SDD), a ROM, a RAM, a CD-ROM, a magnetic tape, a floppy disk, an optical data storage device, and the like. The computer readable recording medium may be implemented in the form of a carrier wave (e.g., transmission over the Internet). Further, the computer may include a processor or a controller. The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

According to the embodiments of the present disclosure, at least the following effects are achieved.

First, the stack assembly inspection apparatus includes the conveyor that carries the stack assembly, the masking mechanism that seals the stack assembly, and the gas injection mechanism that inspects the sealing states of the fluid channels while injecting the inspection gas into the fluid channels of the stack assembly. Accordingly, the stack assembly inspection apparatus may automatically inspect the sealing state of the stack assembly.

Second, the stack assembly inspection apparatus includes the insulation inspection probe and the insulation resistance measuring device electrically connected with the insulation inspection probe. Accordingly, the stack assembly inspection apparatus may automatically inspect the insulation state of the stack assembly.

Effects of the present disclosure are not limited to the aforementioned effects, and any other effects not mentioned herein will be clearly understood from the accompanying claims by those skilled in the art to which the present disclosure pertains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for inspecting a stack assembly that includes a plurality of fuel cell stacks and a fluid channel through which fluid is supplied into the plurality of fuel cell stacks, the apparatus comprising:
   a frame;
   a conveyor installed in the frame and configured to carry the stack assembly in a predetermined direction of movement to locate the stack assembly in a predetermined inspection position;
   a masking mechanism installed in the frame and configured to mask a fluid inlet and a fluid outlet of the stack assembly to seal the fluid channel of the stack assembly from outside the stack assembly; and
   a gas injection mechanism installed in the frame and configured to inject an inspection gas into the fluid channel of the stack assembly to inspect a sealing state of the fluid channel in the stack assembly, in a state in which the stack assembly is sealed by the masking mechanism.

2. The apparatus of claim 1, wherein the stack assembly includes:
   a hydrogen flow channel through which hydrogen is supplied into the fuel cell stacks;
   an air flow channel through which air is supplied into the fuel cell stacks; and
   a coolant flow channel through which coolant flows to cool the fuel cell stacks,
   wherein the gas injection mechanism selectively injects the inspection gas into one of the hydrogen flow channel, the air flow channel, and the coolant flow channel to inspect a sealing state between the hydrogen flow channel, the air flow channel, and the coolant flow channel.

3. The apparatus of claim 2, wherein the stack assembly further includes a first inlet and a first outlet configured to connect to one of the hydrogen flow channel, the air flow channel, and the coolant flow channel and formed in a surface of the stack assembly that faces the predetermined direction of movement,
   wherein the masking mechanism includes a first masking mechanism configured to seal the first inlet and the first outlet, and
   wherein the first masking mechanism includes a first masking pad configured to move in a direction opposite to the predetermined direction of movement to mask the first inlet and the first outlet when the stack assembly is located in the predetermined inspection position.

4. The apparatus of claim 3, wherein the first masking mechanism further includes:
   a first masking mechanism body installed in the frame; and
   a first masking pad actuator installed on the first masking mechanism body and configured to actuate the first masking pad.

5. The apparatus of claim 3, wherein a flow channel connecting to the first inlet and the first outlet among the hydrogen flow channel, the air flow channel, and the coolant flow channel is defined as a first flow channel,
   wherein the first masking pad includes a first masking pad inlet and a first masking pad outlet formed therein to inspect a sealing state of the first flow channel by injecting the inspection gas into the first flow channel, and
   wherein the gas injection mechanism selectively performs an operation of inspecting the sealing state of the first flow channel while injecting the inspection gas into the first flow channel through the first masking pad inlet and suctioning the inspection gas from the first flow channel through the first masking pad outlet.

6. The apparatus of claim 2, wherein the stack assembly further includes a second inlet and a second outlet configured to connect to one of the hydrogen flow channel, the air flow channel, and the coolant flow channel and formed in a surface opposite to a surface of the stack assembly that faces the predetermined direction of movement,
   wherein the masking mechanism includes a second masking mechanism configured to seal the second inlet and the second outlet, and
   wherein the second masking mechanism includes a second masking pad configured to move in a lower direction perpendicular to the predetermined direction of movement and thereafter in the predetermined direction of movement to mask the second inlet and the second outlet when the stack assembly is located in the predetermined inspection position.

7. The apparatus of claim 6, wherein the second masking mechanism further includes:
a second masking mechanism body; and
a second masking body actuator installed in the frame and configured to vertically move the second masking mechanism body.

8. The apparatus of claim 7, wherein the second masking mechanism further includes a second masking pad actuator installed on the second masking mechanism body and configured to actuate the second masking pad.

9. The apparatus of claim 8, wherein the second masking mechanism further includes a linear guide installed on the second masking mechanism body to guide a linear movement of the second masking pad in the predetermined direction of movement and a direction opposite to the predetermined direction of movement.

10. The apparatus of claim 6, wherein a flow channel connecting to the second inlet and the second outlet among the hydrogen flow channel, the air flow channel, and the coolant flow channel is defined as a second flow channel,
wherein the second masking pad includes a second masking pad inlet and a second masking pad outlet formed therein to inspect a sealing state of the second flow channel by injecting the inspection gas into the second flow channel, and
wherein the gas injection mechanism selectively performs an operation of inspecting the sealing state of the second flow channel while injecting the inspection gas into the second flow channel through the second masking pad inlet and suctioning the inspection gas from the second flow channel through the second masking pad outlet.

11. The apparatus of claim 1, wherein the stack assembly further includes a valve configured to adjust the supply of the fluid into the fluid channel and a connector for electrical connection between the stack assembly and an external device,
wherein the gas injection mechanism includes a valve opening/closing probe configured to control opening/closing of the valve, and
wherein the valve opening/closing probe is moved toward the connector and connected with the connector when the stack assembly is located in the predetermined inspection position.

12. The apparatus of claim 1, wherein the gas injection mechanism includes a gas information acquisition device configured to obtain a first flow rate or pressure before the introduction of the inspection gas into the fluid channel and a second flow rate or pressure after passage of the inspection gas through the fluid channel.

13. The apparatus of claim 1, wherein the apparatus further comprises an insulation inspection probe and an insulation resistance measuring device electrically connected with the insulation inspection probe, to inspect an insulation state of the stack assembly, and
wherein the insulation inspection probe includes a plurality of contact terminals configured to make contact with a plurality of points on the stack assembly when the stack assembly is located in the predetermined inspection position.

14. The apparatus of claim 13, wherein the plurality of contact terminals of the insulation inspection probe make contact with a positive electrode terminal, a negative electrode terminal, and a case of the stack assembly to inspect insulation resistance between the positive electrode terminal of the stack assembly and the case of the stack assembly and insulation resistance between the negative electrode terminal of the stack assembly and the case of the stack assembly.

15. The apparatus of claim 1, further comprising:
a mounting jig on which the stack assembly is mounted, wherein the mounting jig is carried in the predetermined direction of movement and a direction opposite to the predetermined direction of movement by the conveyor; and
a fixing mechanism installed in the frame to fix the stack assembly in the predetermined inspection position during the inspection,
wherein the fixing mechanism is moved toward the mounting jig and combined with the mounting jig when the mounting jig having the stack assembly mounted thereon is carried to a position where the stack assembly is located in the predetermined inspection position.

16. An apparatus for inspecting a stack assembly that includes a plurality of fuel cell stacks and a fluid channel through which fluid is supplied into the plurality of fuel cell stacks, the apparatus comprising:
a frame;
a conveyor installed in the frame and configured to carry the stack assembly;
a masking mechanism installed in the frame and configured to seal the fluid channel of the stack assembly from outside the stack assembly;
a gas injection mechanism installed in the frame and configured to inspect a sealing state of the fluid channel by using an inspection gas; and
a controller including at least one processor and a memory connected to the at least one processor and configured to store a plurality of instructions,
wherein the instructions, when executed, cause the processor to:
control the conveyor to locate the stack assembly in a predetermined inspection position;
control the masking mechanism to mask a fluid inlet and a fluid outlet of the stack assembly, in a state in which the stack assembly is located in the predetermined inspection position; and
control the gas injection mechanism to inspect a sealing state of the stack assembly while injecting the inspection gas into the fluid channel of the stack assembly, in a state in which the stack assembly is sealed by the making mechanism.

17. The apparatus of claim 16, wherein the apparatus further comprises an insulation inspection probe and an insulation resistance measuring device electrically connected with the insulation inspection probe,
wherein the insulation inspection probe includes a plurality of contact terminals configured to make contact with a plurality of points on the stack assembly, and
wherein the instructions, when executed, cause the processor to:
control the plurality of contact terminals of the insulation inspection probe to make contact with a positive electrode terminal, a negative electrode terminal, and a case of the stack assembly and inspect an insulation state of the stack assembly, in the state in which the stack assembly is located in the predetermined inspection position.

* * * * *